April 24, 1956
P. S. BACKLUND
2,743,213
WAX DEOILING PROCESS
Filed Sept. 27, 1952
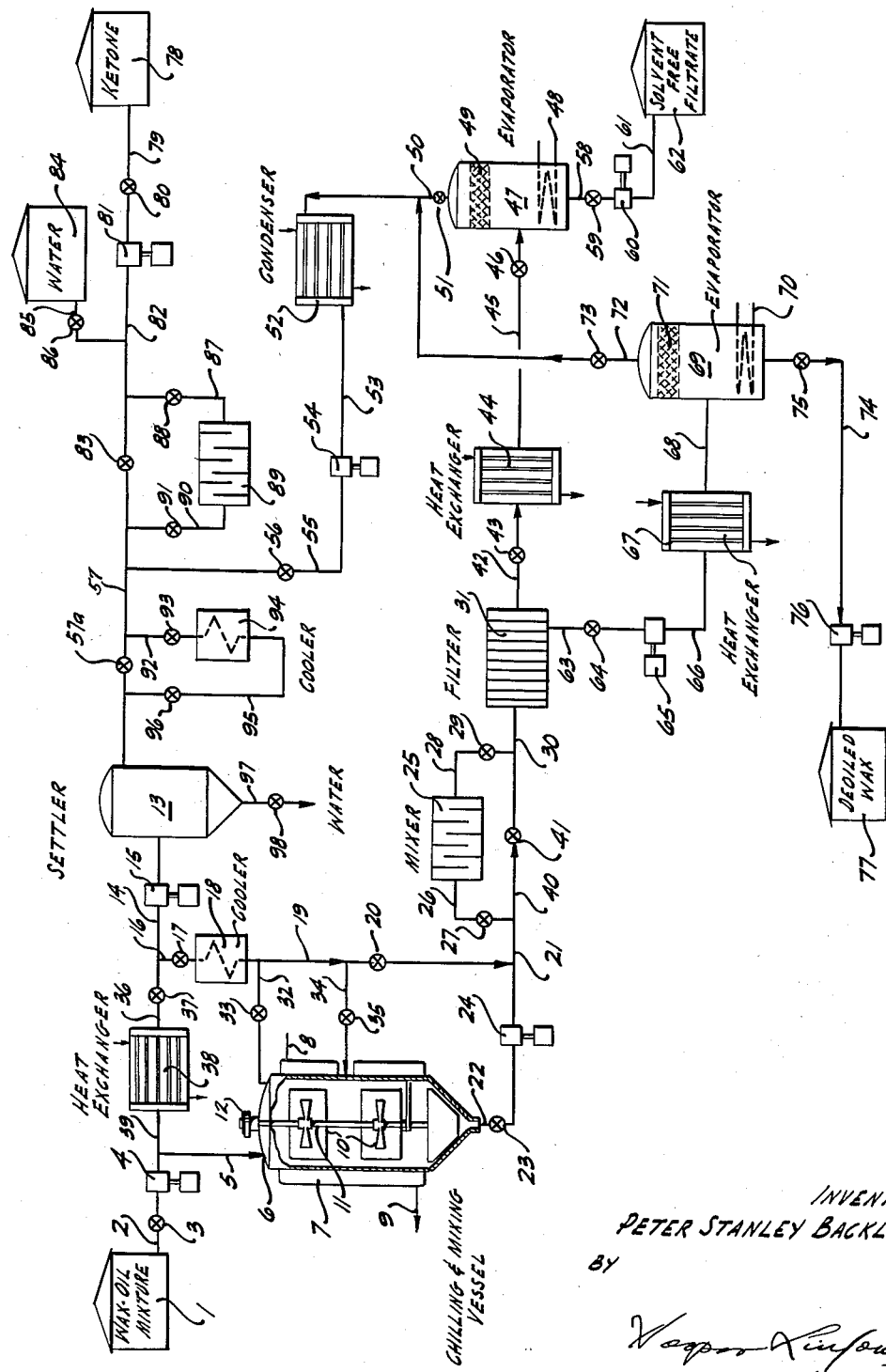
INVENTOR.
PETER STANLEY BACKLUND
BY
AGENT.

United States Patent Office 2,743,213
Patented Apr. 24, 1956

2,743,213

WAX DEOILING PROCESS

Peter Stanley Backlund, Anaheim, Calif., assignor to Union Oil Company of California, Los Angeles, Calif., a corporation of California Application September 27, 1952, Serial No. 311,857

7 Claims. (Cl. 196—20)

This invention relates to a process of treating wax-oil mixtures containing relatively high proportions of wax, to separate oil-free wax and relatively wax-free oil. More particularly it relates to a process of treating slack waxes with a solvent consisting of a ketone or a particular mixture of ketones and water to produce relatively high yields of oil-free wax at a given deoiling temperature.

Various ketones, mixtures of ketones and ketone-hydrocarbon mixtures have been used as solvents in the separation of oil from wax. Acetone and particularly methyl ethyl ketone have been extensively used for this purpose. However, these ketones are only partially miscible with high viscosity index oils at deoiling temperatures and therefore can not be successfully employed as deoiling solvents. The oil miscibility of these ketones can be increased by the addition thereto of an aromatic solvent, as for example benzene or toluene or by the addition of a higher molecular weight ketone, as for example one containing 5 or 6 carbon atoms per molecule. The resulting mixed solvents, although having good oil miscibility, have appreciable solvency for the wax which is to be separated. In other words, these solvents are not sufficiently selective in their ability to dissolve oil and reject wax to permit optimum recovery of wax in the deoiling operations. Methyl isobutyl ketone and other ketones having 5 or 6 carbon atoms per molecule when used alone are found to have good oil miscibility at the usual deoiling temperatures but again these ketones have the property of dissolving wax to an undesirable degree. A particular disadvantage of using a solvent or solvent mixture of the type mentioned is that in order to obtain high yields of wax in deoiling it is necessary to employ lower deoiling temperatures, i. e. filtration temperatures, than should be necessary provided a solvent were available having good oil miscibility and extremely low solvent power for the wax which is to be separated.

It has furthermore been proposed to use mixtures of aromatic hydrocarbons, ketones and water as deoiling solvents for deoiling slack waxes. However, such solvents, although somewhat more efficient than mixtures of aromatic hydrocarbons and ketones without water, still fail to permit the separation of high yields of oil-free wax from slack waxes.

It has now been found that solvents having the desired oil miscibility and yet extremely low solvent power for wax are obtained by adding small amounts of water to aliphatic ketones having 5 to 6 carbon atoms in the molecule and particularly methyl isobutyl ketone, methyl-n-butyl ketone and methyl-n-propyl ketone. The amount of water to be added is relatively small and will generally be that amount which is soluble in the ketone at the deoiling temperature to be employed. The proportion of water to be used will be at least 1.9% by weight and less than about 3.7% by weight of the solvent composition. The addition of water does not appear to decrease the oil miscibility of these ketones to an undesirable extent and yet it does decrease the solubility of wax in the solvent and/or in the solvent-oil solution. The presence of water in the solvent does not appear to change the crystal form of wax separated on cooling the wax-oil mixtures. Cooling may be effected in the presence of small amounts of solvent, e. g. in the presence of only a portion of the total deoiling solvent to be employed in the process, in the presence of all of the solvent to be employed or in the complete absence of solvent and the solvent, or the remaining portion of the solvent, may be added following completion of the chilling or cooling operation. Slurries of wax in the oil-solvent mixture, particularly those obtained by cooling in the absence of solvent or in the presence of only a portion of the solvent to be employed, filter readily and produce non-porous filter cakes which do not crack during the filtration process. Moreover, the wax cakes produced are readily and efficiently washed on the filter with additional quantities of the solvent containing water.

Thus, it is an object of this invention to separate wax-oil mixtures containing relatively high proportions of wax into oil-free wax and relatively wax-free oil employing a solvent which has sufficient oil solubility to permit the separation of substantially oil-free wax and yet has limited wax solubility so that high yields of wax are recovered.

Another object of this invention is to separate oil-free wax from slack wax in relatively high yields using a process having relatively low chilling requirements.

A further object of this invention is to provide a deoiling process applicable to slack waxes and other wax-oil mixtures containing major proportions of wax, employing a solvent comprising a ketone having 5 to 6 carbon atoms per molecule and a small amount of water, which solvent has good oil miscibility and very poor solvency for wax.

Another object of this invention is to provide a deoiling solvent which when employed in conventional deoiling processes permits the separation of higher yields of oil-free wax from a given slack wax at a given temperature than is obtainable using conventional deoiling solvents or conventional deoiling solvent mixtures.

A specific object of this invention is to provide a process for the separation of hydrocarbon wax-oil mixtures containing relatively high proportions, i. e. between about 50% and about 98% or more of wax, using as a deoiling solvent an aliphatic ketone having 5 to 6 carbon atoms per molecule and having dissolved therein an amount of water between about 1.9% and about 3.7% by weight based on the total solvent composition and preferably the solvent will consist of a saturated solution of water in the ketone employed.

According to this invention wax-oil mixtures containing relatively high proportions of wax, as for example between about 50% and about 98% of wax, and particularly slack waxes, are deoiled by heating the wax-oil mixtures sufficiently to effect solution of the wax in the oil, chilling the wax-oil mixtures to cause crystallization of wax, mixing the chilled mass with a deoiling solvent consisting of a ketone solution of water, containing between about 1.9% and about 3.7% of water, and separating wax from the resulting slurry. The ketone to be employed is an aliphatic ketone having 5 or 6 carbon atoms per molecule and the amount of water employed is preferably that amount which forms a saturated solution of water in the ketone at the deoiling temperature. Since deoiling temperatures are generally not far different from ordinary temperatures and since the presence of small amounts of free water in the cooled wax-oil-solvent mixture does not effect the crystal structure or filtration characteristics of the separated wax, it is convenient to employ a solvent consisting of one of the mentioned ketones which is saturated with water at ordinary temperatures and such use is intended to be considered within the scope of this invention. Thus as used herein, the term "saturated solution" includes those solutions which are saturated at ordinary temperatures, at the deoiling temperatures or at temperatures intermediate between ordinary and deoiling temperatures these particular ketone-water solvents appear to have outstanding selectivity for the oil present in the wax-oil mixture and thus dissolve the oil without having any appreciable solvent action on the wax which has been crystallized.

Following the addition of solvent and agitation of the solvent with the cooled wax-oil mixture, the wax is separated from the resulting slurry by filtration in the conventional manner and washed on the filter with additional quantities of the same solvent mixture which is preferably maintained at the filtration temperature. It is found that wax cakes produced on the filter in this process are relatively dense and compact and yet they filter rapidly and are readily washed. Moreover, these wax cakes do not crack during filtration nor while washing with solvent.

The chilling may be effected in the complete absence of deoiling solvent and the total deoiling solvent to be employed added subsequent to the chilling operation or chilling may be effected in the presence of a part of the total deoiling solvent to be employed in the process. The latter method of chilling may be necessary with wax-oil mixtures of high wax content and/or with wax-oil mixtures obtained from viscous mineral oil fractions, raffinates or the like, since such wax-oil mixtures may tend to become solid during the chilling unless some solvent is present, particularly in the later stages of chilling. The amount of solvent to be added in such cases is preferably only that amount necessary to reduce the viscosity of the wax-oil mass to a point where agitation and flow of the wax-oil mass through the chiller can be accomplished. This method of solvent addition is often referred to as the incremental method of solvent addition.

The solvent mixture of this invention, i. e. the mixture of ketone with water, may be employed in the deoiling processes wherein, the wax-oil mixture after being heated to effect solution of the wax in oil, is diluted with the total amount of deoiling solvent to be employed and the resulting wax-oil-solvent solution is then chilled to the desired filtration temperature and filtered. This method of operation may result in the production of wax cakes which are not readily washed. However, with certain wax-oil mixtures this method has given entirely satisfactory results and is, therefore, encompassed by this invention.

Deoiling temperatures, i. e. temperatures at which the slurry of wax in oil-solvent mixture is filtered, will vary with the type of slack wax employed, the melting point of the wax present in the slack wax, the viscosity of the oil from which the slack wax was originally obtained and the proportion of low melting point wax desired in the oil-free wax recovered. Generally the temperatures of filtration or the so-called deoiling temperatures will be in the range of about 35° F. to about 80° F. and in most instances temperatures between 50° F. and 70° F. appear to permit the removal of the desired proportions of wax in relatively oil-free form.

The amount of deoiling solvent to be employed will be between about 0.5 and about 4 parts per part of wax-oil mixture to be separated. The particular amount of deoiling solvent to be employed will depend upon the characteristics of the wax-oil mixture being treated. Generally between about 2 and about 3 parts of deoiling solvent per part of wax-oil mixture will be used.

Ketones which may be used in the preparation of the deoiling solvents of this invention include those aliphatic ketones having 5 or 6 carbon atoms per molecule and which are capable of dissolving between 1.9% and 3.7% by weight of water. The preferred ketones of this group to be employed consist of methyl-n-propyl ketone, methyl-n-butyl ketone and methyl isobutyl ketone. The selectivity of these ketones, containing the indicated amounts of water, for oil in wax-oil mixtures is outstanding and the use of such solvents results in the production of high yields of oil-free wax at a given deoiling temperature.

In carrying out the process of the invention the desired solvent mixture, i. e. the desired proportion of water in ketone, may be prepared by adding water in the desired amounts to the ketone or, where necessary to the solvent recovered and recycled in the process. In the event that some water is recovered along with solvent in the solvent recovery stage, the amount of water added to the recovered solvent will be only that amount necessary to produce the desired concentration. The proportion of water in the solvent may be readily controlled, particularly in those instances in which the solvent consists of a saturated solution of water in ketone at the filtration temperature or other given temperature by adding an excess of water, cooling the water-ketone mixture to the desired temperature and passing this mixture into a water separator where water in excess of that amount necessary to produce a saturated solution is permitted to settle. The resulting saturated solution is removed from the separator and used in the process for admixture with the wax-oil mixture.

The method of operation of this invention may be better understood by reference to the following description of the drawing which drawing represents a flow diagram of the process of this invention. Referring to the drawing, a waxy stock of relatively high wax content, as for example, a slack wax obtained by dewaxing a selective solvent extracted, SAE 50 waxy distillate obtained from a waxy California crude oil, or from dewaxing the distillate itself or other distillates or raffinates obtained from waxy crude oils, is maintained in storage tank 1 at a temperature sufficiently high to effect solution of the wax contained in the oil. The wax-oil solution or melt is withdrawn from tank 1 through line 2 controlled by valve 3 and pumped by means of pump 4 through line 5 into chilling and mixing vessel 6. Vessel 6 is provided with a jacket 7 into which a cooling liquid to cool the wax-oil mixture may be introduced by means of line 8 and removed through line 9. Vessel 6 is also provided with agitating or stirring paddles and scrapers 10 on shaft 11 which is rotated by pulley 12 connected to a suitable source of power not shown. In vessel 6 the wax-oil mixture is gradually cooled to the desired temperature of dewaxing while it is constantly stirred by agitating paddles and scrapers. The stirring rate is very slow being merely sufficient to prevent the wax-oil mixture from setting up into a solid non-fluid mass.

When the desired temperature has been reached the deoiling solvent, as for example methyl isobutyl ketone saturated with water at the temperature of filtration, is mixed with the chilled wax-oil mixture to produce a slurry which filters readily. The solvent may be mixed with the wax-oil mixture which has been chilled to the desired temperature in vessel 6 in which case the solvent is removed from settler 13 through line 14 by means of pump 15 through line 16 controlled by valve 17 and passed through cooler 18 where it is brought to the temperature of the wax-oil mixture to be diluted. The cooled solvent leaving cooler 18 may be mixed with the chilled or cooled wax-oil mixture by passing it through line 19 controlled by valve 20 into line 21. In line 21 the cooled solvent is mixed with chilled or cooled wax-oil mixture withdrawn from vessel 6 through line 22 controlled by valve 23 and pumped by means of pump 24 into line 21. The resulting mixture of solvent, wax and oil is then passed into mixer 25 through line 26 controlled by valve 27. The mixed wax-oil solvent slurry is removed from the mixer through line 28 controlled by valve 29 into line 30 and passed directly to filter 31 where wax and a solution of oil in solvent are separated.

Where it is desired to add solvent incrementally during the cooling operation the solvent leaving cooler 18 through line 19 may be passed through line 32 controlled by valve 33 into chiller, or if the solvent is to be added after chilling has proceeded to a certain degree, it may be introduced from line 19 through line 34 controlled by valve 35. In such cases, generally only a portion of the solvent is introduced into chilling and mixing vessel 6 during the chilling operation, the remainder of the solvent being added after chilling has been completed either through lines 32 or 34, or preferably the remainder of the solvent is added to the chilled, partially diluted mixture in line 21 and subsequently mixed in mixer 25 as indicated above.

In another alternative procedure, which is not to be considered equivalent to the above described procedures in that filtration rates of slurries produced are not as great nor are the wax cakes produced as easily or completely washed on the filter as when the previously described methods of solvent addition are employed, the deoiling solvent leaving settler 13 through line 14 is passed through line 36 controlled by valve 37, through heat exchanger 38 where the temperature of the solvent is raised to approximately the temperature of the wax-oil mixture in tank 1 and thence through line 39 into line 5 where it is mixed with the wax-oil solution entering through line 2. The resulting solution of wax in oil and solvent is chilled in chiller 6 to the desired filtration temperature and passed from the chiller through line 22 into line 21 as indicated hereinabove and thence through line 40 controlled by valve 41 into line 30 and thence to filter 31.

The slurry of cooled wax-oil and solvent entering filter 31 through line 30 is filtered to separate the wax suspended in the slurry from the oil and solvent. The filtrate, consisting of oil and solvent from which solid wax has been removed, is passed through line 42 controlled by valve 43 into heat exchanger 44 where the temperature is raised so as to permit vaporization of the solvent. The preheated solution is then passed through line 45 controlled by valve 46 into evaporator 47. In the evaporator, solvent is vaporized aided by steam which is circulated through closed coil 48. Vapors passing through mist extractor 49 are withdrawn through line 50 controlled by valve 51 and passed through condenser 52. The condensed solvent is removed from the condenser through line 53 and pumped by means of pump 54 through line 55 controlled by valve 56 into line 57 controlled by valve 57a for return to settler 13 as will be described hereinbelow.

The wax cake deposited on the filtering element 31 is preferably washed with cooled solvent prior to its removal in order to wash out oils remaining in the filter cake. The cooled solvent may be obtained by passing solvent from settler 13 through cooler 18 and lines 19, 21, 40 and 30 as indicated hereinabove. The wash solvent leaving filter 31 may also be passed through heat exchanger 44 into evaporator 47 and the evaporated solvent passed through condenser 52 from which it is returned to line 57 as indicated hereinabove for the solvent removed from the filtrate.

The solvent-free filtrate obtained after removal of solvent from the original filtrate and the residue obtained after removing solvent from the washings are removed from evaporator 47 through line 58 controlled by valve 59 and pumped by means of pump 60 through line 61 into storage tank 62.

The wax separated in filter 31 is removed through line 63 controlled by valve 64 and pumped by means of pump 65 through line 66, heat exchanger 67 and line 68 into evaporator 69 where solvent is removed from the wax aided by heat supplied by closed steam coil 70. The vaporized solvent is passed through mist extractor 71 and leaves the evaporator via line 72 controlled by valve 73, from which it is passed into line 50 and returned to line 57 as indicated hereinabove for the solvent recovered in evaporator 47. The solvent-free, oil-free wax is removed from the bottom of evaporator 69 through line 74 controlled by valve 75 and pumped by means of pump 76 into storage tank 77.

The deoiling solvent employed in the process and described hereinabove as being removed from settler 13 may be originally prepared by withdrawing ketone from storage tank 78 through line 79 controlled by valve 80 and pumped by means of pump 81 through line 82 controlled by valve 83, and thence through line 57 controlled by valve 57a into settler 13. Water is withdrawn from tank 84 through line 85 controlled by valve 86 and passed into line 82 where it is mixed with ketone and passed into settler 13 with the ketone. In order to insure proper mixing of the ketone and water when preparing the original solvent, the mixture of water and ketone in line 82 may be passed through line 87 controlled by valve 88 into mixer 89 and returned to line 57 through line 90 controlled by valve 91. The mixed ketone and water in line 57 may be passed through line 92 controlled by valve 93 through cooler 94 and thence through line 95 controlled by valve 96 into settler 13. In settler 13, water in excess of that amount which is soluble in the ketone at the temperature employed, may be withdrawn through line 97 controlled by valve 98. This water may be discarded or it may be treated for the recovery of ketone in apparatus not shown.

In operating the process in a continuous manner, the solvent recovered in the process from evaporators 47 and 69 and being introduced into line 57 will generally contain the desired amount of water for further use in the process. However, if necessary either water or ketone or both may be added to the recovered solvent to maintain the proper ratio of ketone to water and/or to replace solvent losses. These additions may be made through the lines previously indicated.

The following are submitted as specific examples of various modifications of the process forming the subject matter of this invention. It is to be understood however that these examples are not to be construed as limiting but merely as representative of this invention.

The slack waxes used in the following examples were typical commercial slack waxes prepared by dewaxing selective solvent raffinate obtained from a long residuum from waxy California crude oil. The particular slack waxes employed were fractions of slack wax obtained by fractional distillation of the slack wax from the solvent raffinate. In preparing these slack waxes a California waxy crude oil having a gravity of 33.1° API was topped to a Saybolt Universal viscosity at 210° F. of about 250 seconds. This long residuum was then deasphalted and solvent extracted using a combination treatment with propane and a selective solvent consisting of a mixture of phenol and cresols to obtain a deasphalted solvent raffinate. This raffinate had a gravity of 30.1° API and a viscosity of 57.4 SSU at 210° F. This waxy raffinate containing 31% by weight of wax was then dewaxed using propane as the dewaxing solvent at temperatures of about —40° F. to obtain a slack wax containing about 29.5% of oil. Depending upon the dewaxing process employed the oil content will be between about 5% and 35% by weight. Typically slack waxes prepared in this manner will contain between about 25% and about 30% by weight of oil. The slack wax produced as above was then fractionally distilled to produce three overhead fractions which will be referred to hereinafter as Streams 0, 1 and 2 and a bottoms fraction. Typical tests on each of these fractions of slack wax are shown in Table 1.

TABLE 1

|  | Percent | Gravity, API | Viscosity, SU at 210° F. | Percent Oil |
|---|---|---|---|---|
| Stream 0 | 25 | 38.3 | 38.4 | 36.7 |
| Stream 1 | 25 | 36.8 | 42.8 | 32.0 |
| Stream 2 | 40 | 34.9 | 54.3 | 29.7 |
| Bottoms | 10 | 27.6 | 113.3 | 21.9 |

Example I

In the following experiments Stream 2 slack wax produced as above described was deoiled following the process of this invention using as the deoiling solvent methyl isobutyl ketone containing different proportions of water and, for purposes of comparison, using methyl isobutyl ketone without water as the deoiling solvent. This ketone will be referred to hereinafter as MIBK.

A. *Deoiling with MIBK saturated with water at 50° F.*—100 parts by weight of Stream 2 slack wax was heated to a temperature of 175° F. to produce a homogeneous melt. The heated wax was then cooled to 50° F. at the rate of about 1° F. per minute. During the cooling the mass was stirred slowly to prevent the separated wax from setting up into a solid mass. Also during the cooling a total of 40 parts by weight of MIBK saturated with water at 50° F. (about 1.9% water) was added. The solvent was added in two equal increments when the temperature of the wax-oil mass being cooled reached 135° F. and 110° F., respectively. After the mass had been cooled to 50° F. an additional 220 parts by weight of the same solvent was added and mixed with the cooled wax-oil mass. The resulting slurry consisting of wax crystals in suspension in the solvent-oil solution was filtered and the resulting wax cake was washed on the filter with 260 parts by weight of the same solvent, i. e. MIBK saturated with water at 50° F.

The slurry filtered very readily giving a compact filter cake which did not crack on the filter during filtration or while washing with solvent. The yield and melting point of the wax separated in the above deoiling operation are shown in Table 2. The oil content of the product was 0.03%.

B. *Deoiling with MIBK saturated with water at ordinary temperature.*—The deoiling process described under Part A of this example was repeated except that the deoiling solvent employed was MIBK containing 2.1% by weight of water which is approximately the amount of water soluble in MIBK at about 70° F. which may be referred to as ordinary temperature. The filtration temperature was 50° F. Data regarding the yield and melting point of the wax recovered in this deoiling operation are shown in Table 2. The oil content of the product was 0.03%.

C. *Deoiling with MIBK without water.*—For purposes of comparison, the deoiling procedure of Part A of this example was repeated except that anhydrous MIBK was employed as the deoiling solvent. Yield and melting point data are shown in the following table:

TABLE 2

| Deoiling Process | Solvent | Melting Point of Wax, ° F., (Galician) | Yield of Wax Based on Slack Wax, Percent by Weight |
|---|---|---|---|
| Part A | MIBK plus 1.9% Water | 153.1 | 50.0 |
| Part B | MIBK plus 2.1% Water | 153.1 | 50.0 |
| Part C | MIBK | 154.0 | 47.5 |

Example II

In the following experiments Stream 2 slack wax produced as described hereinabove was deoiled following the process of this invention using as the deoiling solvent methyl-n-propyl ketone containing various proportions of water and, for purposes of comparison, using methyl-n-propyl ketone without water as the deoiling solvent. This ketone will be referred to hereinafter as MPK.

A. *Deoiling with MPK saturated with water at 50° F.*—100 parts of the Stream 2 slack wax was heated to a temperature of 175° F. to produce a homogeneous melt. The heated wax was then cooled to 50° F. at the rate of about 1° F. per minute. During the cooling the mass was stirred slowly to prevent the separated wax from setting up into a solid mass. Also during the cooling a total of 40 parts by weight of MPK saturated with water at 50° F. (about 3.3% water) was added. The solvent was added in two equal increments when the temperature of the wax-oil mass being cooled reached 135° F. and 110° F., respectively. After the mass had been cooled to 50° F. an additional 220 parts by weight of the same solvent was added and mixed with the cooled wax-oil mass. The resulting slurry consisting of wax crystals in suspension in the solvent-oil solution was filtered and the resulting wax cake was washed on the filter with 260 parts by weight of the same solvent, i. e. MPK saturated with water at 50° F.

The slurry filtered very readily giving a compact filter cake which did not crack on the filter during filtration or while washing with solvent. The yield and melting point of the wax separated in the above deoiling operation are shown in Table 3.

B. *Deoiling with MPK containing 1.9% of water.*—The deoiling procedure described under Part A was repeated except that in this case the deoiling solvent consisted of MPK containing 1.9% of water. The filtration and washing characteristics of the wax were substantially identical with those described in Part A. Yield and melting point data are shown in Table 3.

C. *Deoiling with MPK saturated with water at ordinary temperature.*—The deoiling process described under Part A of this example was repeated except that the deoiling solvent employed was MPK containing 3.6% by weight of water, which is approximately the amount of water soluble in MPK at about 70° F. which may be referred to as ordinary temperature. The filtration temperature was 50° F. Data regarding the yield and melting point of the wax recovered in this deoiling operation are shown in Table 3.

D. *Deoiling with MPK without water.*—For purposes of comparison, the deoiling procedure of Part A of this example was repeated except that anhydrous MPK was employed as the deoiling solvent. Yield and melting point data are shown in the following table:

TABLE 3

| Deoiling Process | Solvent | Melting Point of Wax, ° F., (Galician) | Yield of Wax Based on Slack Wax, Percent by Weight |
|---|---|---|---|
| Part A | MPK plus 3.3% Water | 151.0 | 54.3 |
| Part B | MPK plus 1.9% Water | 151.4 | 53.8 |
| Part C | MPK plus 3.6% Water | 151.1 | 54.2 |
| Part D | MPK | 152.3 | 50.5 |

The oil contents of the deoiled waxes obtained by each of the above methods was less than 0.05% by weight in all cases.

Example III 100 parts by weight of Stream 2 slack wax produced as indicated hereinabove was heated to a temperature of 165° F. to effect solution of wax in the oil and the heated wax was then cooled to 50° F. at the rate of 1° F. per minute with constant, slow agitation. When the temperature reached 50° F., 260 parts by weight of methyl-n-butyl ketone containing approximately 3.7% by weight of water, cooled to 50° F., was added and thoroughly mixed with cooled wax-oil mixture. This amount of water was approximately the amount necessary to saturate the ketone with water at ordinary temperatures. The resulting slurry was filtered and the wax cake washed on the filter with an additional 250 parts of the same solvent. The resulting wax, after heating to remove solvent, amounted to 50.2% by weight based on the Stream 2 wax and had a melting point of 153° F. The deoiled wax contained 0.04% oil.

For purposes of comparison the preceding deoiling process was carried out in the same manner except that the deoiling solvent consisted of methyl-n-butyl ketone without water. The recovered wax amounted to 47.0% by weight of the original Stream 1 slack wax and had a melting point of 154° F. and an oil content of 0.04% by weight.

*Example IV*

For purposes of comparison with the deoiling procedures of this invention deoiling experiments were carried out on a portion of the same Stream 2 slack wax used in Examples I, II and III with lower molecular weight and higher molecular weight ketones with and without water. In the case of methyl ethyl ketone (MEK), the lower molecular weight ketone employed, experiments were carried out with the ketone alone and with a mixture of MEK and commercial benzol.

A. *Deoiling with MEK—benzol.*—100 parts by weight of Stream 2 slack wax was heated to a temperature of 175° F. to obtain solution of wax in the oil and then cooled to 50° F. at the rate of about 1° F. per minute with constant slow stirring. During the cooling 40 parts by weight of deoiling solvent consisting of a mixture of 43% MEK and 57% commercial benzol was added in two equal increments when the temperature of the wax-oil mass being cooled reached 135° F. and 100° F., respectively. After cooling to 50° F. an additional 220 parts by weight of the same solvent was added and mixed with the cooled wax oil mass. The resulting slurry was filtered and the wax cake washed on the filter with 260 parts by weight of the same solvent which had been cooled to 50° F. The yield and melting point of the wax separated in this operation are shown in Table 4. The oil content of this product was 0.04% by weight.

B. *Deoiling with MEK—benzol saturated with water at ordinary temperatures.*—The method of Part A above was repeated except that the deoiling solvent employed consisted of a mixture of 43% MEK and 57% commercial benzol containing about 0.8% by weight of water. This was a saturated solution of water at 70° F. The deoiled wax was found to contain 0.06% of oil. Yield and melting point data are shown in Table 4.

C. *Deoiling with MEK.*—The process of Part A of this example was repeated using MEK without water as the solvent. Because of the poor solvency of MEK for oil at lower temperatures the deoiling temperature employed in this instance was 75° F. Yield data on the deoiled wax are shown in Table 4. This wax was found to contain 0.04% by weight of oil.

D. *Deoiling with MEK—water mixtures.*—The above experiment was repeated using a deoiling or filtration temperature of 75° F. and using MEK containing about 12.5% water (saturated), 3% water and 1% water, respectively as the deoiling solvents. In each of these cases the resulting deoiled wax contained high proportions of oil as will be seen by reference to Table 4 which shows yield, melting point and oil content data for the deoiled waxes prepared in this manner.

E. *Deoiling with di-isobutyl ketone (DIBK).*—The process of Part A of this example was repeated at 50° F. and at 60° F. using di-isobutyl ketone as the deoiling solvent. Yields and melting point data on the waxes are shown in Table 4. These waxes contained less than about 0.05% by weight of oil.

F. *Deoiling with DIBK saturated with water at ordinary temperature.*—Part E of this example was repeated using as the deoiling solvent di-isobutyl ketone containing about 0.4% by weight of water (saturated solution). Data regarding the deoiled waxes obtained are shown in Table 4. These products were found to contain less than about 0.05% by weight of oil.

TABLE 4

| Deoiling Process | Filtration Temperature, °F. | Melting Point of Wax, °F. (Galician) | Yield of Wax Based on Slack Wax, Percent by Weight |
|---|---|---|---|
| Part A, MEK—Benzol | 50 | 155.3 | 42.2 |
| Part B, MEK—Benzol Plus 0.8% Water | 50 | 154.9 | 43.2 |
| Part C, MEK | 75 | 154.5 | 42.4 |
| Part D, MEK Plus 12.5% Water | 75 | 144.3 | a 72.5 |
| Part D, MEK Plus 3% Water | 75 | 149.4 | b 64.8 |
| Part D, MEK Plus 1% Water | 75 | 153.9 | c 45.2 |
| Part E, DIBK | 50 | 155.2 | 42.0 |
| Part E, DIBK | 60 | 156.4 | 38.6 |
| Part F, DIBK Plus 0.4% Water | 50 | 154.9 | 42.5 |
| Part F, DIBK Plus 0.4% Water | 60 | 156.0 | 38.1 | a Contained 22.42% oil.
b Contained 11.26% oil.
c Contained 0.82% oil.

It will be observed from the above experiments that when using ketones of higher and lower molecular weight than those described herein as being operable, yields of oil-free wax from a given slack wax are low compared to the yields obtained following the teaching of this invention.

It will be observed that with MEK unless benzol or other good oil solvent is employed, complete deoiling, i. e. substantially complete removal of oil from the wax is not realized if water is present in the solvent composition. When mixtures of MEK-benzol are employed deoiling is accomplished but yields of deoiled wax are low and the addition of water does not cause sufficient improvement in yield to make the process feasible. Thus using a solvent consisting of 43% MEK and 57% benzol saturated with water the yield of oil-free wax from Stream 2 slack wax was only 43.2% whereas using the aqueous solvents of this invention yields of wax were in the range of 50–54% by weight of the slack wax.

In the case of di-isobutyl ketone, not only were the yields of deoiled wax low, there was little if any improvement obtained by saturating the ketone with water.

*Example V*

100 parts by weight of Stream 0 slack wax produced as indicated hereinabove was heated to a temperature of 165° F. to effect solution of wax in the oil and the heated wax was then cooled to 60° F. at the rate of 1° F. per minute with constant slow agitation. When the temperature had reached 60° F., 260 parts by weight of MIBK containing approximately 2% by weight of water, cooled to 60° F., was added and thoroughly mixed with cooled wax-oil mixture. The resulting slurry was filtered and the wax cake washed on the filter with an additional 250 parts of the same solvent. The resulting wax, after heating to remove solvent, amounted to 49.0% by weight based on the Stream 0 wax and had a melting point of 127° F. and an oil content of 0.07% by weight.

For purposes of comparison the preceding deoiling process was carried out in the same manner except that the deoiling solvent consisted of MIBK without water. The recovered wax amounted to 45.0% by weight of the original Stream 0 slack wax and had a melting point of 128° F. and an oil content of 0.06% by weight.

*Example VI*

100 parts by weight of Stream 0 slack wax produced as indicated hereinabove was heated to a temperature of 165° F. to effect solution of wax in the oil and the heated wax was then cooled to 60° F. at the rate of 1° F. per minute with constant slow agitation. When the temperature had reached 50° F., 260 parts by weight of methyl-n-propyl ketone containing approximately 2.5% by weight of water, cooled to 60° F., was added and thoroughly mixed with the cooled wax-oil mixture. The resulting slurry was filtered and the wax cake washed on the filter with an additional 250 parts of the same solvent.

The resulting wax, after heating to remove solvent, amounted to 49.8% by weight based on the Stream O wax and had a melting point of 126.5° F.

For purposes of comparison the preceding deoiling process was carried out in the same manner except that the deoiling solvent consisted of methyl-n-propyl ketone without water. The recovered wax amounted to 45.5% by weight of the original Stream O slack wax and had a melting point of 127.5° F.

The foregoing explanatory description of my invention is not to be considered as limiting since many variations may be made within the scope of the following claims by those skilled in the art without departing from the spirit thereof. It will be observed that in the foregoing description of the drawing, only single pieces of apparatus have been shown for carrying out the process. It is to be understood that duplicate equipment may be provided where necessary, which may be operated alternately, so that the process may be carried out more or less continuously.

I claim:

1. A process for deoiling wax-oil mixtures containing from about 50 to about 98% of wax which comprises bringing said wax-oil mixture to a temperature sufficient to dissolve the wax in the oil, cooling the resulting solution with agitation to crystallize wax, commingling the cooled wax-oil mass with a cooled solvent consisting of an aliphatic ketone of 5 to 6 carbon atoms per molecule having dissolved therein between about 1.9% and 3.7% by weight of water, to dissolve the oil, leaving the wax substantially completely undissolved, separating the solvent solution of oil from the crystallized wax, evaporating a solvent comprising said ketone containing water from the solvent solution of oil and recycling the recovered solvent for reuse in the process.

2. A process for the separation of a substantially oil-free wax from wax-oil mixtures containing from about 50 to about 98% of wax which comprises bringing said wax-oil mixtures to a temperature sufficient to dissolve the wax in the oil, cooling the resulting solution with agitation to a temperature between about 35° F. and about 80° F. to crystallize wax, commingling the cooled wax-oil mass with a cooled solvent consisting of a ketone selected from the class consisting of methyl isobutyl ketone, methyl-n-butyl ketone and methyl-n-propyl ketone and between about 1.9% and about 3.7% of water to dissolve the oil, leaving the wax substantially completely undissolved, separating the solvent solution of oil from the crystallized wax, evaporating solvent comprising said ketone and water from the solvent solution of oil and recycling the recovered solvent for reuse in the process.

3. A process according to claim 2 wherein said solvent consists of a saturated solution of water in said ketone.

4. A process according to claim 2 in which said ketone is methyl isobutyl ketone.

5. A process according to claim 2 in which said ketone is methyl-n-butyl ketone.

6. A process according to claim 2 in which said ketone is methyl-n-propyl ketone.

7. A process for the treatment of slack wax to separate relatively high yields of oil-free wax therefrom, which process comprises heating said slack wax to a temperature sufficient to dissolve the wax in the oil present in said slack wax, cooling the resulting wax-oil solution with agitation to crystallize wax, at least a part of said cooling being effected in the presence of a quantity of solvent less than the total quantity of solvent to be employed in the wax separation process, to produce a mass which is fluid at the cooling temperature, commingling said cooled, fluent wax-oil-solvent mixture with the remainder of the solvent to be used in the wax separation process, which solvent has been cooled to the temperature of the wax-oil-solvent mixture to dissolve the oil present, separating the solvent solution of oil as filtrate from the crystallized wax, evaporating solvent from said filtrate and recycling said evaporated solvent for reuse in the process, said solvent consisting of a ketone having dissolved therein between about 1.9% and about 3.7% by weight of water, said ketone being a ketone selected from the class consisting of methyl isobutyl ketone, methyl-n-butyl ketone and methyl-n-propyl ketone.

References Cited in the file of this patent

UNITED STATES PATENTS

| | | |
|---|---|---|
| 1,669,151 | Wagner | May 8, 1928 |
| 2,229,658 | Jenkins | Jan. 28, 1941 |
| 2,273,153 | Stratford | Feb. 17, 1942 |
| 2,550,058 | Gee | Apr. 24, 1951 |
| 2,584,966 | Reeves | Feb. 5, 1952 |
| 2,688,587 | Pokorny et al. | Sept. 7, 1954 |
| 2,696,459 | Benedict | Dec. 7, 1954 |